(12) United States Patent
Chang

(10) Patent No.: US 8,189,689 B2
(45) Date of Patent: May 29, 2012

(54) RECEIVER FOR REDUCING PCR JITTER

(75) Inventor: Tien-Hsin Chang, Tainan (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 307 days.

(21) Appl. No.: 12/190,420

(22) Filed: Aug. 12, 2008

(65) Prior Publication Data

US 2010/0040092 A1 Feb. 18, 2010

(51) Int. Cl.
*H04N 7/12* (2006.01)
*H04J 3/06* (2006.01)

(52) U.S. Cl. ............... 375/240.27; 375/240.25; 370/516

(58) Field of Classification Search ......................... None
See application file for complete search history.

(56) References Cited

U.S. PATENT DOCUMENTS

| | | | |
|---|---|---|---|
| 2005/0138521 A1* | 6/2005 | Suzuki et al. | 714/755 |
| 2005/0259695 A1* | 11/2005 | Nemiroff et al. | 370/517 |
| 2008/0025424 A1* | 1/2008 | Yang et al. | 375/260 |
| 2008/0212775 A1* | 9/2008 | Mirsky et al. | 380/210 |
| 2009/0080545 A1* | 3/2009 | Nicolas | 375/260 |
| 2009/0270025 A1* | 10/2009 | Kossi et al. | 455/3.01 |
| 2010/0034140 A1* | 2/2010 | Song et al. | 370/328 |

* cited by examiner

*Primary Examiner* — Kwang B Yao
*Assistant Examiner* — Jutai Kao
(74) *Attorney, Agent, or Firm* — Baker & McKenzie LLP

(57) ABSTRACT

A receiver receiving a transport stream to demodulate the transport stream into a final output stream, wherein the transport stream comprises a plurality of symbols at least one of which carrying at least one program clock reference (PCR) value, and the final output stream comprises a plurality of demodulated symbols each comprising a plurality of packets, is disclosed. The receiver can comprise a Reed-Solomon decoder configured to decode the transport stream to generate a MPEG (Motion Pictures Expert Group) packet, a MPEG memory configured to store the MPEG packet, and a descrambler configured to read the MPEG packet from the MPEG memory with a throughput rate and descramble the MPEG packet into one of the packets of the demodulated symbols of the final transport stream. The throughput rate is decreased to reduce bursts of the packets of the demodulated symbols of the final output stream.

16 Claims, 4 Drawing Sheets

RECEIVER FOR REDUCING PCR JITTER

BACKGROUND

1. Technical Field

The embodiments described herein relate to a receiver in a communication system and more particularly to a receiver in a communication system for reducing program clock reference (PCR) jitter.

2. Description of the Related Art

In the field of data communications, one highly demanding application is transmission of full motion video in video-on-demand applications. Digital Video Broadcasting-Terrestrial (DVB-T) standard is a DVB European consortium standard for broadcast transmission of digital terrestrial television. This system transmits a compressed digital audio/video stream using OFDM modulation with concatenated channel coding (i.e. COFDM). The adopted source coding method, for example, is Moving Picture Experts Group (MPEG) standard, number 2 (commonly called "MPEG-2"), as defined in standard ISO/IEC 13818-1: 1996 promulgated by the ISO/IEC.

A MPEG-2 transport stream involves transmission of video and audio information in transport stream packets of 188 bytes in length. Each packet includes a header, which contains control information, and a payload, which contains video or audio information. The MPEG-2 transport stream may carry multiple different programs simultaneously. Each packet in the transport stream is associated with a program by a packet identifier (PID) contained within the header. The header is of variable length, depending on whether it contains an adaptation field. The adaptation field contains control information that is not necessarily present in every transport stream packet.

Periodically, the transport packet for each program includes a program clock reference (PCR) value within the optional adaptation field. For example, the PCR may be present in only 10 out of every 4000 video transport packets. The PCR is a representation of a system time clock that was used at the source to encode the data in the transport stream packet. PCR values for a particular program are received with different transport stream packets having the same PID. A series of PCR values can be used to reconstruct the system time clock at a receiver in a communication channel.

The MPEG-2 transport stream may, for example, be transmitted through asynchronous transfer mode (ATM) networks developed for high speed, packetized digital transmission of data, audio and video. One of the parameters used in characterizing an MPEG-2 transport stream is PCR jitter. In an ideal communication channel, all transport stream packets, and therefore all PCR samples, are received at a fixed time after transmission. However, in a real communication channel, variable delays may be introduced by different channel elements. For example, different transport stream packets may follow different network paths in reaching the final destination. Variations in arrival times result in PCR jitter. PCR jitter is described in standard ISO/IEC 13818-9: 1996.

MPEG receivers synchronize internal clocks to received PCR values by sampling the PCR values. If the PCRs do not arrive with sufficient regularity, then the regenerated STC may jitter or drift. The greater the PCR jitter, the harder it is to recover an accurate clock in a MPEG receiver. The MPEG receiver may even go out of lock.

Conventional technology for reducing PCR jitter is using an extra PCR buffer for storing demodulated symbols and outputting the same in a regular order. However, the PCR buffer size requirements can be large, for example, 20*199*8*2=60160 bits in worst case of 64 QAM and code rate equal to ⅞, resulting in high cost in VLSI implementation. Therefore, a low-cost solution for PCR jitter reduction in a receiver is needed.

SUMMARY

A low-cost demodulator and demodulation method for reducing PCR jitter, is described herein.

According to one aspect, a receiver receiving a transport stream to demodulate the transport stream into a final output stream, the transport stream comprising a plurality of symbols at least one of which is carrying at least one program clock reference (PCR) value, the final output stream comprising a plurality of demodulated symbols each comprising a plurality of packets. The receiver can comprise a Reed-Solomon decoder configured to decode the transport stream to generate a MPEG (Motion Pictures Expert Group) packet, a MPEG memory configured to store the MPEG packet, and a descrambler configured to read the MPEG packet from the MPEG memory with a throughput rate and descramble the MPEG packet into one of the packets of the demodulated symbols of the final transport stream, wherein the throughput rate is decreased to reduce bursts of the packets of the demodulated symbols of the final output stream.

According to another aspect, a demodulation method is disclosed for demodulating the transport stream into a final output stream, the transport stream comprising a plurality of symbols at least one of which carries at least one program clock reference (PCR) value, the final output stream comprising a plurality of demodulated symbols each comprising a plurality of packets. The method can comprise: decoding the transmitted data symbols to generate a MPEG (Motion Pictures Expert Group) packet, storing the MPEG packet, and reading the stored MPEG packet with a reading rate and then descrambling the MPEG packet into one of the packets of the demodulated symbols, wherein the throughput rate is decreased to reduce bursts of the demodulated symbols of the final output stream to minimize jitter between the packets of the demodulated data symbols of the final output stream.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
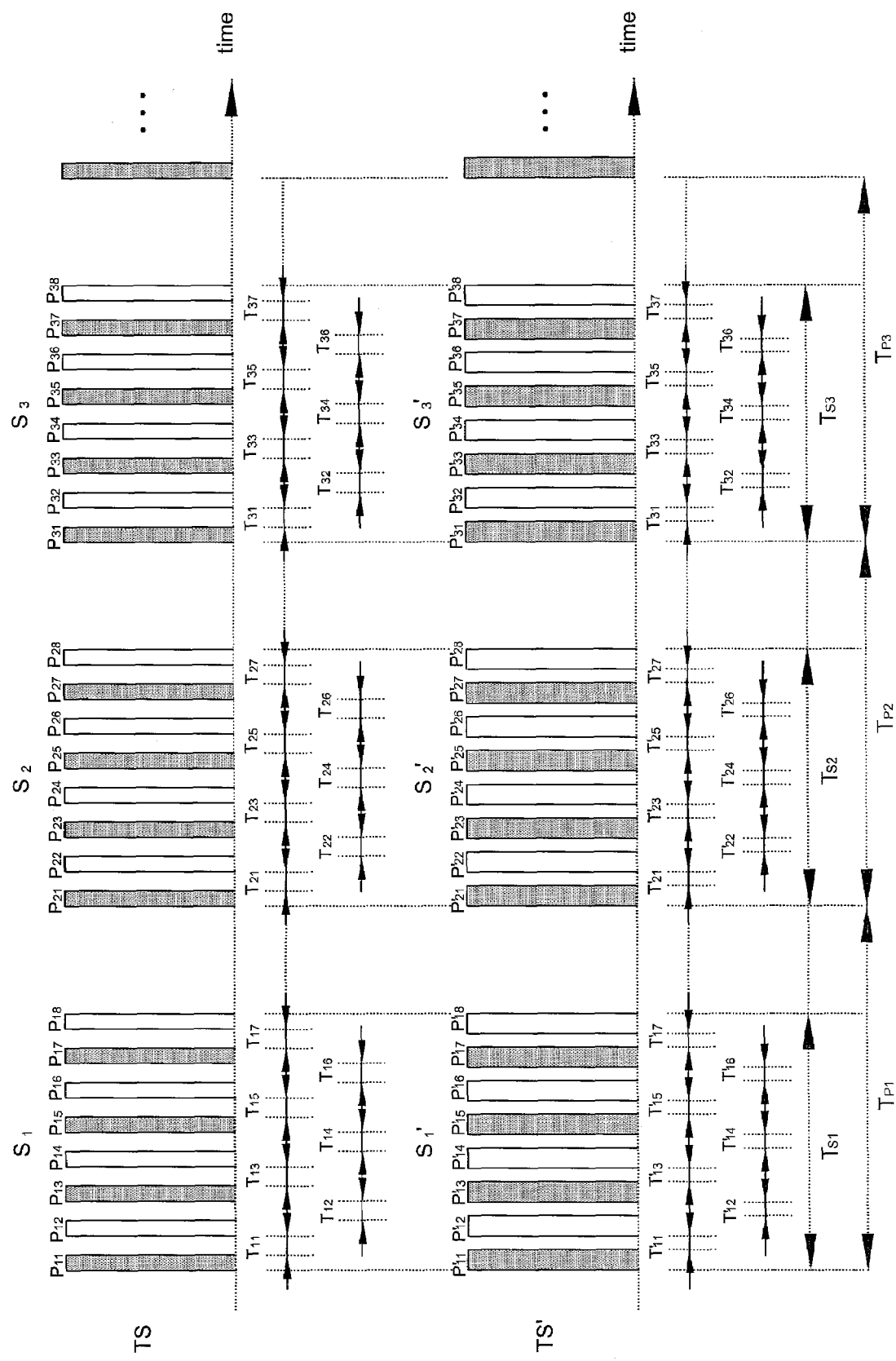
FIG. 1 is a drawing for explaining PCR jitter reduction of a transport stream, in accordance with one embodiment.

FIG. 1 is a drawing for explaining PCR jitter reduction of a transport stream, in accordance with one embodiment. A transport stream TS (e.g. a MPEG transport stream) has undergone demodulation without PCR-jitter reduction. As shown, the transport stream TS can be formed by a sequence of symbols $S_1$-$S_n$, where n=3 in the example. Each of the symbols $S_i$ ($1 \leq i \leq 3$) can be further formed by a sequence of packets $P_{i1}$-$P_{im}$, where m=8 in the example. Some packets indicated by gray color contain PCRs embedded as auxiliary data. As clearly shown, bursts within the symbols $S_1$-$S_3$, represented by time intervals $T_{ij}$, where $1 \leq j \leq 7$ in the example, can result in unequal intervals between the times of the PCR values, known as PCR jitter. The greater the time intervals $T_{ij}$, the greater the PCR jitter in the transport stream TS FIG. 1 also shows a transport stream TS' that has undergone demodulation with PCR-jitter reduction according to one embodiment. As shown, the time intervals $T_{ij}$ ($1 \leq i \leq 3$, and $1 \leq j \leq 7$) can be decreased in the transport stream TS', and hence symbols $S_1'$-$S_3'$ exhibit more uniform distribution. The PCR jitter of the transport stream TS' can be accordingly reduced compared to the transport stream TS. In the embodiment shown in the figure, symbol lengths $T_{S1}'$-$T_{S3}'$ of transport stream TS' are greater than symbol lengths $T_{S1}$-$T_{S3}$ of transport stream TS, while the symbol periods of the transport streams TS and TS' are both equal to $T_{P1}$-$T_{P3}$, and the symbol lengths of the symbol periods of the transport streams TS and TS' are both equal to $T_{S1}$-$T_{S3}$. However, in alternative embodiments, the symbol periods of the transport streams TS and TS' can be unequal, or in other alternative embodiments, the symbol lengths of the transport streams TS and TS' can be unequal. According to a demodulation process for reducing PCR-jitter provided by one embodiment, the time intervals $T_{b1}$-$T_{b3}$ are decreased simply by storing a sequence of symbols that have undergone bit-deinterleaving process and then reading the sequence of symbols with a decreased throughput rate, as will be described in detail below.

Figure 2:
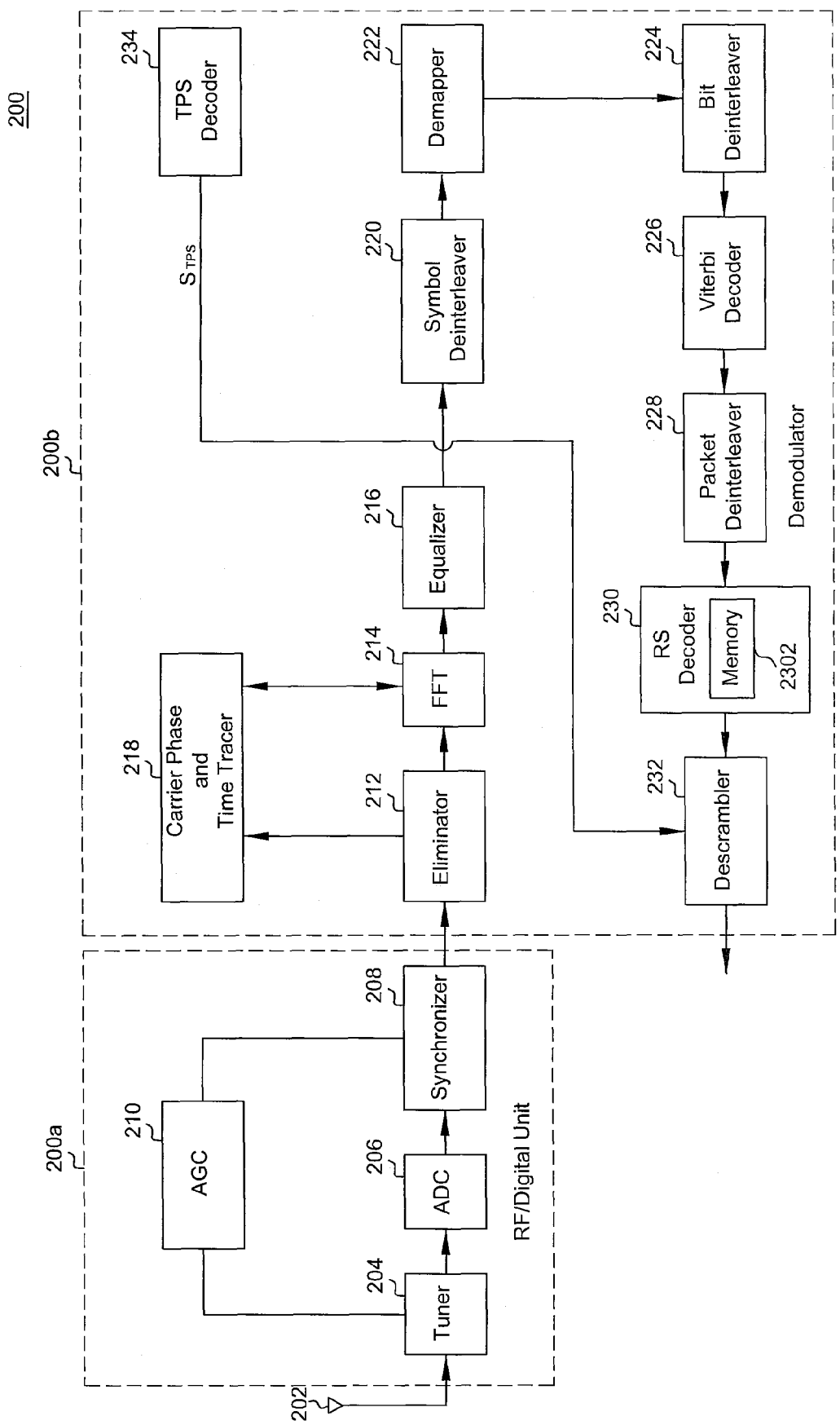
FIG. 2 is a block diagram of a receiver, in accordance with one embodiment.

FIG. 2 is a block diagram of a receiver 200 in accordance with one embodiment. Referring to FIG. 1, the receiver 200 can include a RF/digital unit 200 configured to amplify and convert an analog RF signal received through an antenna 202 to base-band and convert the amplified analog signal into digital signal, and a demodulator 200b configured to perform demodulation. The receiver 200 in the embodiment, for example, can be a DVB-T receiver but is not limited thereto. Additionally, the RF signal in the embodiment, for example, can be a MPEG-2 transport stream but is not limited thereto. Additionally, the demodulator 200b, for example, can be an OFDM demodulator for performing OFDM demodulator but is not limited thereto.

FIG. 2 also shows a more detailed embodiment of the RF/digital unit 200a. As shown, the RF/digital unit 200a can include a tuner 204, an analog-to digital converter (ADC) 206, a synchronizer 208, and an automatic gain controller (AGC) 210. The tuner 204 can be configured to amplify the analog RF signal (i.e. a transport stream) received through the antenna 202, convert the amplified analog signal into a base-band signal, and filter the base-band signal. The ADC 206 can be configured to convert the based-band signal into the digital signal. The synchronizer 208 can be configured to perform digital signal processing, such as frame synchronization, symbol synchronization, and the like. The automatic gain controller (AGC) 210 can be configured to control a gain of a receiving terminal to be suitable for the digital signal processing. It is noted that all the different types of RF/digital units that currently manufactured are too numerous to list. However, one skilled in the art will quickly realize the potential possibilities and embodiments of the RF/digital unit 200a that the embodiments described herein may encompass.

In detail, the OFDM demodulator 200b can include an eliminator 212, a Fast Fourier Transform (FFT) unit 214, an equalizer 216, a carrier phase and time tracer 218, a symbol deinterleaver 220, a demapper 222, a bit deinterleaver 224, a Vitervi decoder 226, a packet deinterleaver (external deinterleaver) 228, a Reed-Solomon (RS) decoder 230, and a descrambler 232. The eliminator 212 is implemented for eliminating a Guard Interval (GI) and Cyclic Prefix (CP) signal. The Fast Fourier Transform (FFT) unit 214 can be configured to transform a time domain signal into a frequency domain signal. The equalizer 216 can be configured to compensate for distortion caused in amplification or transmission. The carrier phase and time tracer 218 can be configured to trace a phase and a time of a carrier. The symbol deinterleaver 220 can be configured to provide symbol-based deinterleaving on a block basis. The demapper 222 can be configured to convert the symbol-deinterleaved symbols constituted by complex number vectors (e.g., QPSK, 16 QAM or 64 OAM) to a simple bit stream. The bit deinterleaver 224 can be configured to provide bit-based deinterleaving, that is, a bit-wise deinterleaving on a block basis. The Viterbi-decoder 226 can be configured to reverse a coding process that has been performed by an internal/convolutional coder at a transmitter. The packet deinterleaver 228, can be a convolutional deinterleaver operating packet-based deinterleaving, that is, byte-wise deinterleaving within each packet. The RS-decoder 230 can be configured to reverse a coding process that has been performed by a RS coder at the transmitter to correct a transmission error. More specifically, the RS decoder 230 can be configured to generate 188-byte packets from 204-byte packet received; and up to eight random errors per packet can thus be corrected. The descrambler 232 can be configured to descramble the decoded data for removing energy dispersal that has been performed in the transmitter and recovering an original serial bit stream. The descrambler 232 then can be configured to provide the recovered serial bit stream as a final output stream of the demodulator 200b.

The RS-decoder 230 can further comprise a RS-decoder memory 2302 that can be configured to store RS-decoded symbols. After the RS decoder finishes decoding one packet, from the descrambler 232, it can store the decoded packet in the RS-decoder memory 2302 and notify the descrambler 232 to start reading and descrambling the decoded packet. The descrambler 232 can be configured to read the RS-decoder memory 2302 with a decreased throughput rate for the benefit of PCR jitter reduction, as discussed above in connection with FIG. 1, T. Preferably, the throughput rate is minimized under the condition that any symbol in the RS-decoder memory 2302 is not covered by a succeeding symbol before it is output from the RS-decoder memory 2302.

Preferably, the descrambler 232 dynamically optimizes its reading rate to minimize bursts between the demodulated output symbols of the final output stream so as to adapt to various transmission conditions. To accomplish this, the descrambler 232 is at least able to dynamically optimize its reading rate according to transmission parameters of the transport stream such that the demodulation can always provide the best PCR-jitter reduction. In a DVB-T system, the transmission parameters can comprise frame number, constellation (e.g., QPSK, 16-QAM or 64-OAM), hierarchy information (whether the data are coded in normal or hierachical mode with an additional parameter α), code rate (e.g., ½, ⅔, ¾, ⅚, ⅞), guard interval (e.g., 1/32, 1/16, ⅛, ¼), transmission mode (e.g., 2K or 8K), frame number, and cell identification. The descrambler 232 can be configured to dynamically optimize its reading rate according to at least one of these transmission parameters.

FIG. 2 also shows such an embodiment in which the descrambler 232 can be configured to dynamically optimize its reading rate. As shown, the OFDM demodulator 200b can further possesses a TPS (Transmission Parameter signal) decoder 234. The TPS decoder 234 can be configured to receive a frequency component from the FFT 214, recover the information carried by certain carriers of the signal received, and provide a TPS signal $S_{TPS}$ representing the recovered information to the descrambler 232. The information can comprise transmission parameters of the transport stream $S_{TS}$. The descrambler 232 can then dynamically optimize its reading rate according to the transmission parameters carried by the TPS signal $S_{TPS}$.

In one embodiment, to accomplish optimization of the reading rate according to the transmission parameters, the descrambler 232 can be configured to refer to a look-up table recording optimal values of throughput rates corresponding to different combinations of the transmission parameters, wherein the optimal values provide best PCR-reduction. Preferably, the optimal values are obtained by realistic test and measurement. There are various implementations of the look-up table. For example, the look-up table can be implemented as a multiplexer. The multiplexer can be configured to receive the TPS signal and provide a rate control signal controlling the reading rate of the descrambler 232 to be the optimal value.

It is noted that in the embodiments described herein, decrease or minimization of throughput rate is not required to be performed between the RS decoder 230 and the descrambler 232. It is only required that decrease/minimization of throughput ratio is performed for reading data symbols that has undergone bit-deinterleaving, that is, after the bit deinterleaver 224 The embodiment in which decrease or minimization of throughput rate is performed between the RS decoder 230 and the descrambler 232 is because it has best speed performance.

Those skilled in the art will appreciate, however, that the specific patterns and structures shown in FIG. 2 are intended to be exemplary only, and that numerous variations and modifications of the illustrated embodiments are possible, including but not limited to the variation shown in FIG. 2. In fact, it is the unique PCR reduction method provided by the embodiments described herein that makes possible the large number of possible variations and modifications. For example, all the different types of demodulators that are currently manufactured make are too numerous to list. However, one skilled in the art will quickly realize the potential possibilities and embodiments of the demodulator 200*a* that the embodiments described herein may encompass. Several such embodiments are provided in the following figures.

Figure 3:
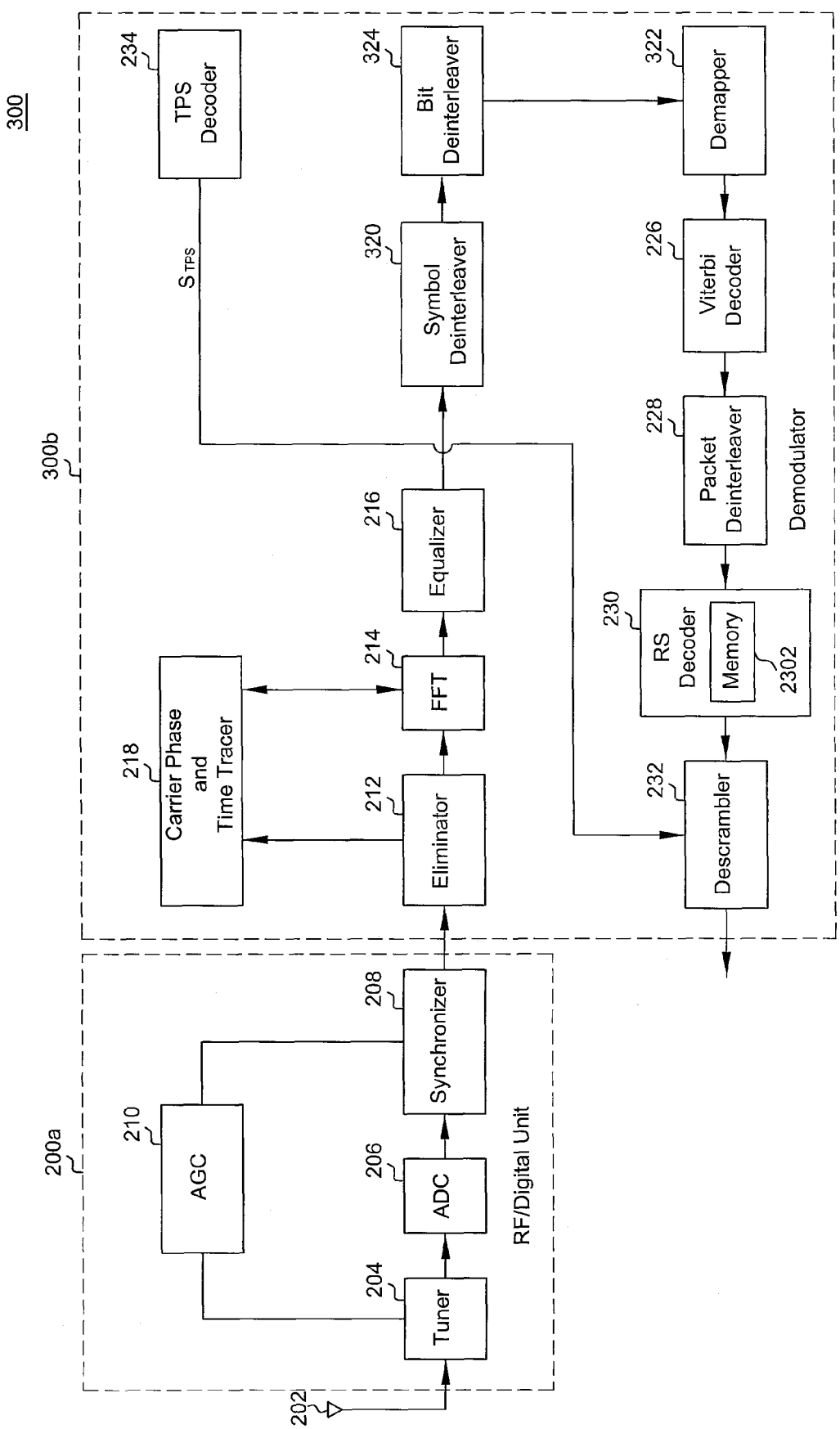
FIG. 3 is a block diagram of a receiver, in accordance with one embodiment.

FIG. 3 shows a receiver 300 in accordance with one embodiment, differing from FIG. 2 only in that the bit-deinterleaver 324 is moved forward and configured to act in conjunction with the symbol-deinterleaver 320 as a so-called inner-deinterleaver. Other details are similar to descriptions in connection to FIG. 2 and are thus omitted here for brevity.

Figure 4:
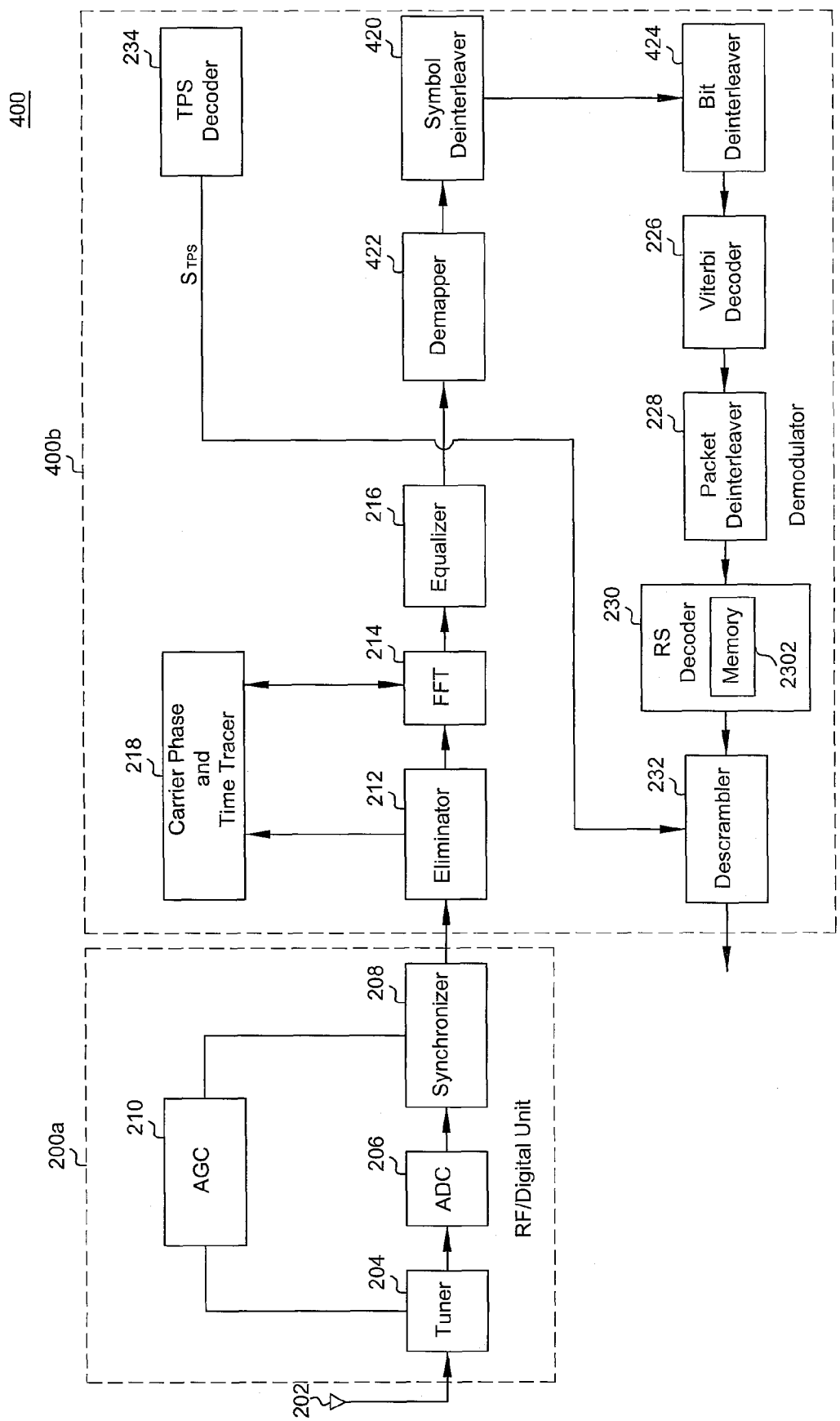
FIG. 4 is a block diagram of a receiver, in accordance with one embodiment.

FIG. 4 shows a receiver 400 in accordance with one embodiment, differing from FIG. 2 only in that the demapper 422 is moved to precede the symbol-deinterleaver 320. Other details are similar to descriptions in connection to FIG. 2 and are thus omitted here for brevity.

Unlike the conventional technology using an additional large PCR buffer, the embodiments described herein uses a memory embedded in the RS decoder, thus saving chip area and implementation cost. Moreover, unlike the conventional technology fixing the throughput rate of the bit-deinterleaved symbols, the embodiment described herein dynamically adjusts the throughput rate to an optimal value, thus having better adaptation to different transmission parameters and hence better PSR reduction performance.

While certain embodiments have been described above, it will be understood that the embodiments described are by way of example only. Accordingly, the apparatus and methods described herein should not be limited based on the described embodiments. Rather, the apparatus and methods described herein should only be limited in light of the claims that follow when taken in conjunction with the above description and accompanying drawings. Therefore, the scope of the appended claims should be accorded the broadest interpretation so as to encompass various modifications and similar arrangements [as would be apparent to those skilled in the art].

What is claimed is:

1. A receiver receiving a transport stream to demodulate the transport stream into a final output stream, the transport stream comprising a plurality of symbols at least one of which carrying at least one program clock reference (PCR) value, the final output stream comprising a plurality of demodulated symbols each comprising a plurality of packets, the receiver comprising:
   a Reed-Solomon decoder configured to decode the transport stream to generate a MPEG (Motion Pictures Expert Group) packet;
   a MPEG memory configured to store the MPEG packet;
   a descrambler; and
   a transmission parameter signal decoder configured to extract information containing transmission parameters related to an applied modulation from the transport stream, and provide the transmission parameters to the descrambler;
   wherein the descrambler is configured to:
       read the MPEG packet from the MPEG memory with a reading rate of the descrambler that is dynamically decreased according to the transmission parameters, and
       descramble the MPEG packet into one of the packets of the demodulated symbols of the final transport stream,
       whereby bursts of the packets of the demodulated symbols of the final output stream are reduced.

2. The receiver of claim 1, wherein the descrambler is configured to dynamically adjust the reading rate to an optimal value.

3. The receiver of claim 2, wherein the transmission parameters comprise a frame number, constellation, hierarchy information, a code rate, a guard interval, a transmission mode, a frame number, and cell identification.

4. The receiver of claim 3, wherein the descrambler is configured to dynamically adjust the reading rate to an optimal value according to the transmission mode and guard interval of the transport stream.

5. The receiver of claim 2, wherein the descrambler is configured to dynamically adjust the reading rate by reference to a look-up table recording optimal values of the reading rate corresponding to different values of the transmission parameters of the transport stream.

6. The receiver of claim 5, wherein the optimal values of the reading rate are obtained by realistic test and measurement.

7. The receiver of claim 1, further comprising a Fast-Fourier Transform unit configured to convert a time-domain signal of the transport stream into a frequency-domain signal, and the transmission parameter signal decoder recovering the transmission parameters from a frequency component of the frequency-domain signal provided by the Fast-Fourier Transform unit.

8. A demodulation method for demodulating a transport stream into a final output stream, the transport stream comprising a plurality of symbols at least one of which carrying at least one program clock reference (PCR) value, the final output stream comprising a plurality of demodulated symbols each comprising a plurality of packets, the method comprising:
   receiving a transport stream;
   decoding data symbols from the transport stream to generate a MPEG (Motion Pictures Expert Group) packet;
   storing the MPEG packet in a memory;
   extracting transmission parameters related to an applied modulation from the transport stream;
   through a descrambler, reading the stored MPEG packet from the memory with a reading rate of the descrambler that is dynamically adjusted according to the transmission parameters of the transport stream, and then descrambling the MPEG packet into one of the packets of the demodulated symbols,
   whereby bursts of the demodulated symbols of the final output stream are reduced for decreasing jitter between the packets of the demodulated data symbols of the final output stream.

9. The demodulation method of claim 8, wherein the transmission parameters comprise a frame number, constellation, hierarchy information, a code rate, a guard interval, a transmission mode, a frame number, and cell identification.

10. The demodulation method of claim 9, wherein the reading rate is dynamically adjusted according to the transmission mode and the guard interval of the transport stream.

11. The demodulation method of claim 8, wherein the reading rate is dynamically adjusted by reference to a look-up table recording optimal values of the reading rate corresponding to different values of the transmission parameters of the transport stream.

12. The demodulation method of claim 11, further comprising obtaining the optimal values of the reading rate by realistic test and measurement.

13. A receiver receiving a transport stream to demodulate the transport stream into a final output stream, the transport stream comprising a plurality of symbols at least one of which carrying at least one program clock reference (PCR) value, the final output stream comprising a plurality of demodulated symbols each comprising a plurality of packets, the receiver comprising:
   a Reed-Solomon decoder configured to decode the transport stream to generate a MPEG (Motion Pictures Expert Group) packet;
   a MPEG memory configured to store the MPEG packet;
   a descrambler; and
   a transmission parameter signal decoder configured to extract information containing transmission parameters related to an applied modulation from the transport stream, and provide the transmission parameters to the descrambler, the transmission parameters comprising a frame number, a constellation, hierarchy information, a code rate, a guard interval, and cell identification;
   wherein the descrambler is configured to:
      read the MPEG packet from the MPEG memory with a reading rate of the descrambler that is dynamically adjusted according to one or more of the transmission parameters, and
      descramble the MPEG packet into one of the packets of the demodulated symbols in the final transport stream.

14. The receiver of claim 13, wherein the descrambler is configured to dynamically adjust the reading rate to an optimal value according to the transmission mode and guard interval of the transport stream.

15. The receiver of claim 13, wherein the descrambler is configured to dynamically adjust the reading rate by reference to a look-up table recording optimal values of the reading rate associated with different values of the transmission parameters of the transport stream.

16. The receiver of claim 15, wherein the optimal values of the reading rate are obtained by realistic test and measurement.

* * * * *